United States Patent [19]

Duyck

[11] Patent Number: 5,557,087
[45] Date of Patent: Sep. 17, 1996

[54] MULTIPLE-MERCHANT CREDIT CARD TERMINAL

[76] Inventor: Margaret Duyck, 42337 N.W. Greenville Rd., Forest Grove, Oreg. 97116

[21] Appl. No.: 423,674

[22] Filed: Apr. 13, 1995

[51] Int. Cl.⁶ ............................................. G06F 5/00
[52] U.S. Cl. ............................. 235/380; 235/379
[58] Field of Search ................................ 235/379, 380

[56] References Cited

U.S. PATENT DOCUMENTS 5,455,407  10/1995  Rujen ............................. 235/380

*Primary Examiner*—Harold Pitts
*Attorney, Agent, or Firm*—Bruce A. Kaser

[57] ABSTRACT

The invention disclosed and claimed here is a multiple-merchant credit card authorization terminal ("CAT"). The CAT enables more than one merchant to input and obtain credit card authorization from a single CAT device. Likewise, transaction settlements may be handled for a single merchant or all of the merchants collectively at the same time. In the past, individual merchants had to use their own dedicated devices.

4 Claims, 4 Drawing Sheets

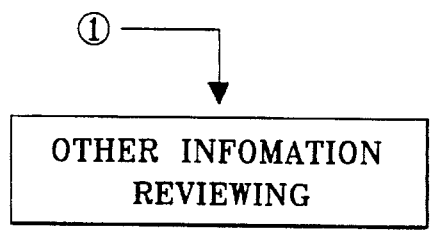
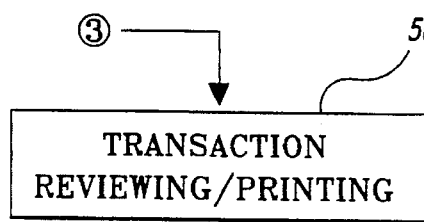
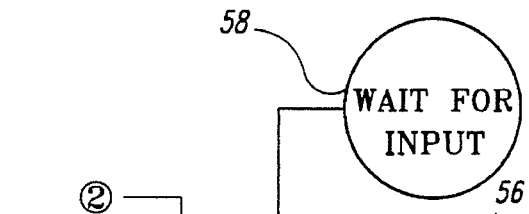
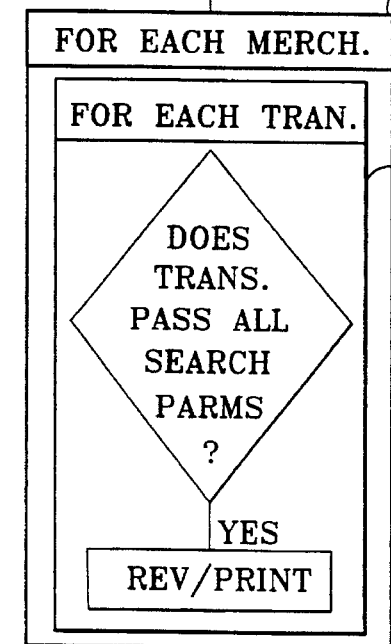
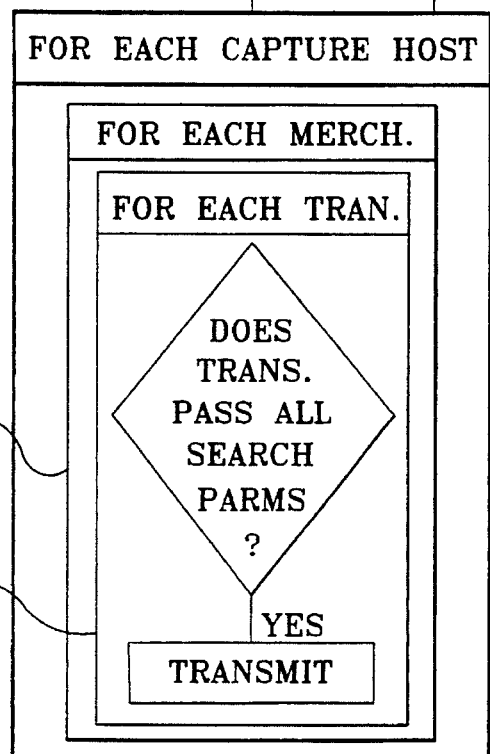
FIG. 4  FIG. 5

MULTIPLE-MERCHANT CREDIT CARD TERMINAL

TECHNICAL FIELD

This invention relates to electronic card authorization terminals adapted to read credit cards, debit cards, proprietary cards, and verify checks (collectively "charge authorization terminals"). More specifically, the invention relates to a charge authorization terminal adapted to be used by more than one merchant for obtaining charge authorization for customer purchases.

BACKGROUND INFORMATION

The use of credit cards to pay for purchases is common in today's world. Most retail merchants have a dedicated card reading or charge authorization terminal ("CAT") for authorizing customer purchases by credit card. Each CAT is set up for the exclusive use of a single merchant. This works fine in many or most retail situations. However, there are certain situations where more than one merchant, or separate business entities, share retail or office space. This is a typical arrangement for many of today's professionals, such as doctors, for example.

By way of illustration, many doctors operate individual practices but share a receptionist and accounting department with other doctors. Many of these doctors are now allowing patients to pay for services by using credit cards. In situations of this kind, the shared accounting department needs to have a separate CAT for each doctor. In other words, if five doctors are practicing out of a single office, the accounting department needs to have five CATs.

In situations like the one described above, i.e., five doctors using five CATs, the total time utilization for all five would be relatively small. Nevertheless, each doctor would pay separately for his or her respective terminal.

It is possible to compress the unnecessary duplication of individual CATs in situations like the above into a single terminal that is usable by more than one professional (or merchant, as the case may be). The present invention recognizes this and provides a more efficient and cost-effective means for multiple merchants to obtain charge authorization.

SUMMARY OF THE INVENTION

The invention is an improved method of allowing multiple merchants to obtain credit card or other charge authorization for customers. The invention utilizes conventional charge authorization terminal equipment. The equipment is adapted to read data from a credit card, or the like, and make an on-line connection to a transaction processing entity. In accordance with the invention, the terminal equipment is programmed for enhanced operation so as to allow a plurality of merchants to use the same terminal equipment for requesting charge authorization.

The enhanced terminal equipment also offers special advantages in connection with allowing multiple merchants to review and settle merchant transactions. It enables the merchant users to selectively print transaction reports for an individual merchant, if desired, or for all of the merchant users at the same time. Likewise, one or all of the merchant users may selectively settle transactions with any one of the applicable transaction processing entities, as will be further described below.

Although the following description is primarily directed to credit card transactions, it is to be understood that the invention is applicable to other uses as well. For example, the invention could easily be adapted for use in connection with debit card processing, check verification, processing proprietary cards, and other similar uses.

BRIEF DESCRIPTION OF THE DRAWINGS

In the drawings, like reference numerals and letters refer to like parts throughout the various views, and wherein:

FIG. 4 is a continuation of the flow charts shown in FIGS. 2 and 3; and

FIG. 5 is a continuation of the flow charts shown in FIGS. 2–4.

BEST MODE FOR CARRYING OUT THE INVENTION

Figure 1:
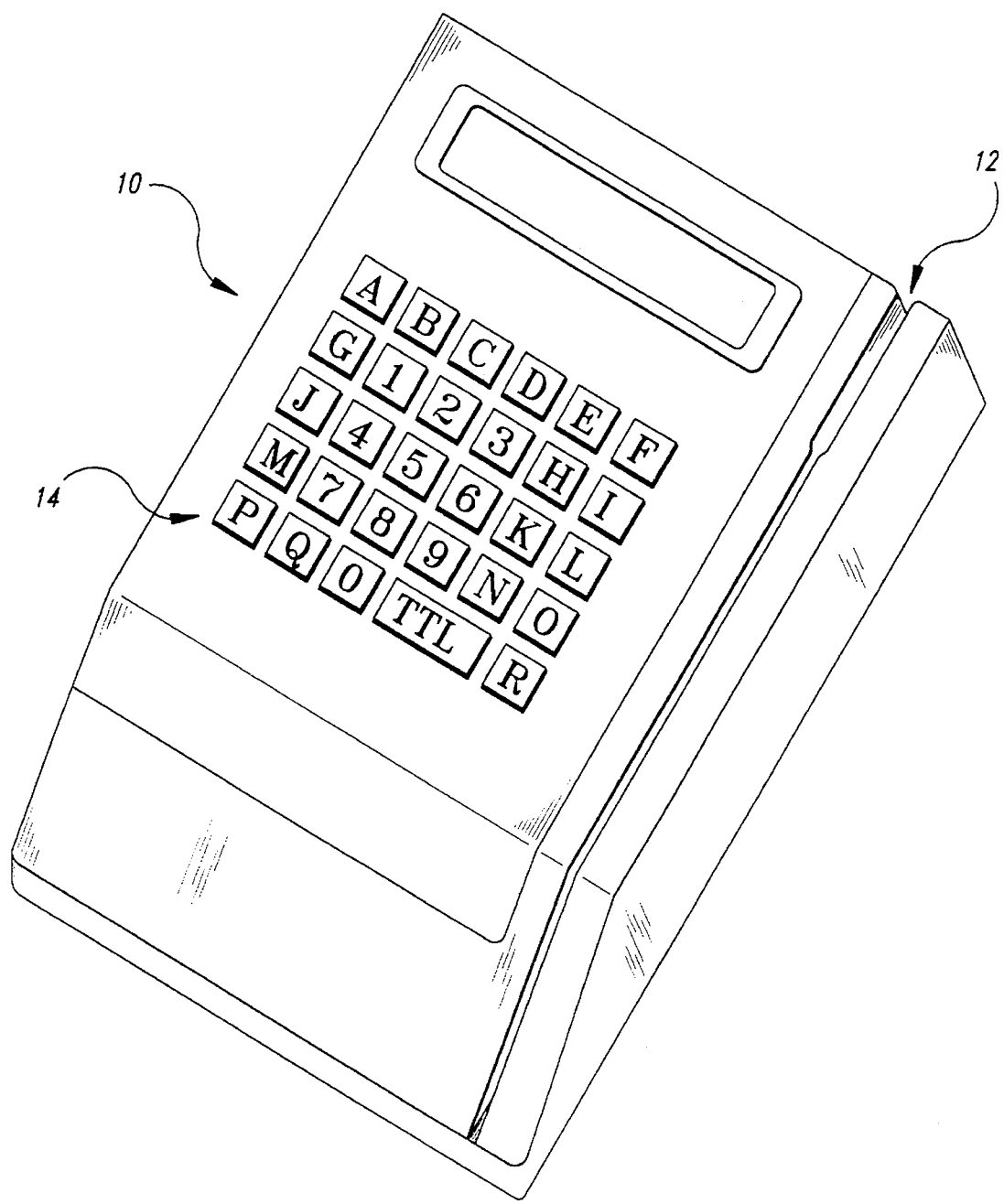
FIG. 1 is a pictorial view of a CAT.

Referring now to the drawings, and first to FIG. 1, shown generally at 10 is a special type of programmable CAT. The terminal 10 is in the prior art and would be known to those familiar with credit card processing.

A typical CAT 10 can be obtained from the First U.S.A. Technology, Inc. ("FUSA"), whose address is 10300 S.W. Nimbus Avenue, Bldg. P, Suite A, Tigard, Oreg. 97223, along with information as to how the terminal is to be operated. Hereafter, the terminal 10 shall, at times, be referred to as the "FUSA terminal" or the "enhanced FUSA terminal." When "enhanced" is used, it corresponds to how a conventional CAT 10, or conventional FUSA CAT, may be functionally enhanced in accordance with the invention.

The terminal 10, with or without the invention described below, is conventional in operation. The person skilled in the art would know how it is used or adapted to obtain data from a credit card and how it connects to a credit charge or other transaction authorizing entity. The skilled person would also know how the transaction authorizing entity processes the transactions received from the terminal 10. The sequence of operation is usually as follows: first, a credit card is either swiped through a slot 12 or the number and expiration date on the card are keyed in on a keypad 14. Then, the amount of the credit card charge which needs to be authorized is keyed in. This is followed by the terminal 10 dialing a telephone number corresponding to a host computer, as will be further described below.

In some cases, special transactions are involved in using the terminal 10. One example of a special transaction involves crediting or returning money to a customer. In such cases, the merchant must indicate that the transaction is special, which may or may not involve use of a special merchant password prior to entry of the special transaction information. Special transactions would be familiar to those having working knowledge of CATs.

The host computer (hereafter "transaction processing entity") could belong to any one of several processing entities which are in business today. For example, First Connect(™) is a well-known system which processes credit card transactions. The Mastercard(™) Automated Point of Sale Program ("MAPP") and VisaNet(™) are two other well-known systems. First Connect, MAPP, and VisaNet are networks which tie into banks and obtain authorization for individual credit card charges. Depending on the type of credit card used, the FUSA terminal 10, for example, will dial into MAPP, VisaNet, or another system. This is done automatically once the terminal recognizes the type of card.

In typical use, the terminal 10 subsequently receives charge authorization from the transaction processing entity. At that point, the terminal 10 prints out a customer receipt, thereby ending the transaction for that particular customer.

The terminal 10 is used to batch process all transactions at the end of each day. At that time, the merchant can, with the press of a button or two, cause the terminal 10 to initiate the electronic processing of funds by the applicable transaction processing entity. The operation just described is typical to the FUSA terminal, and other conventional CATs, with or without the enhancements described below.

Although the focus of the above description is on credit-card processing, it should also be mentioned that there are other kinds of networks for handling different kinds of financial transactions besides pure credit card processing. As far as the improvement described here is concerned, multiple merchant processing, as described below, would work the same way for these other transactions.

Figure 2:
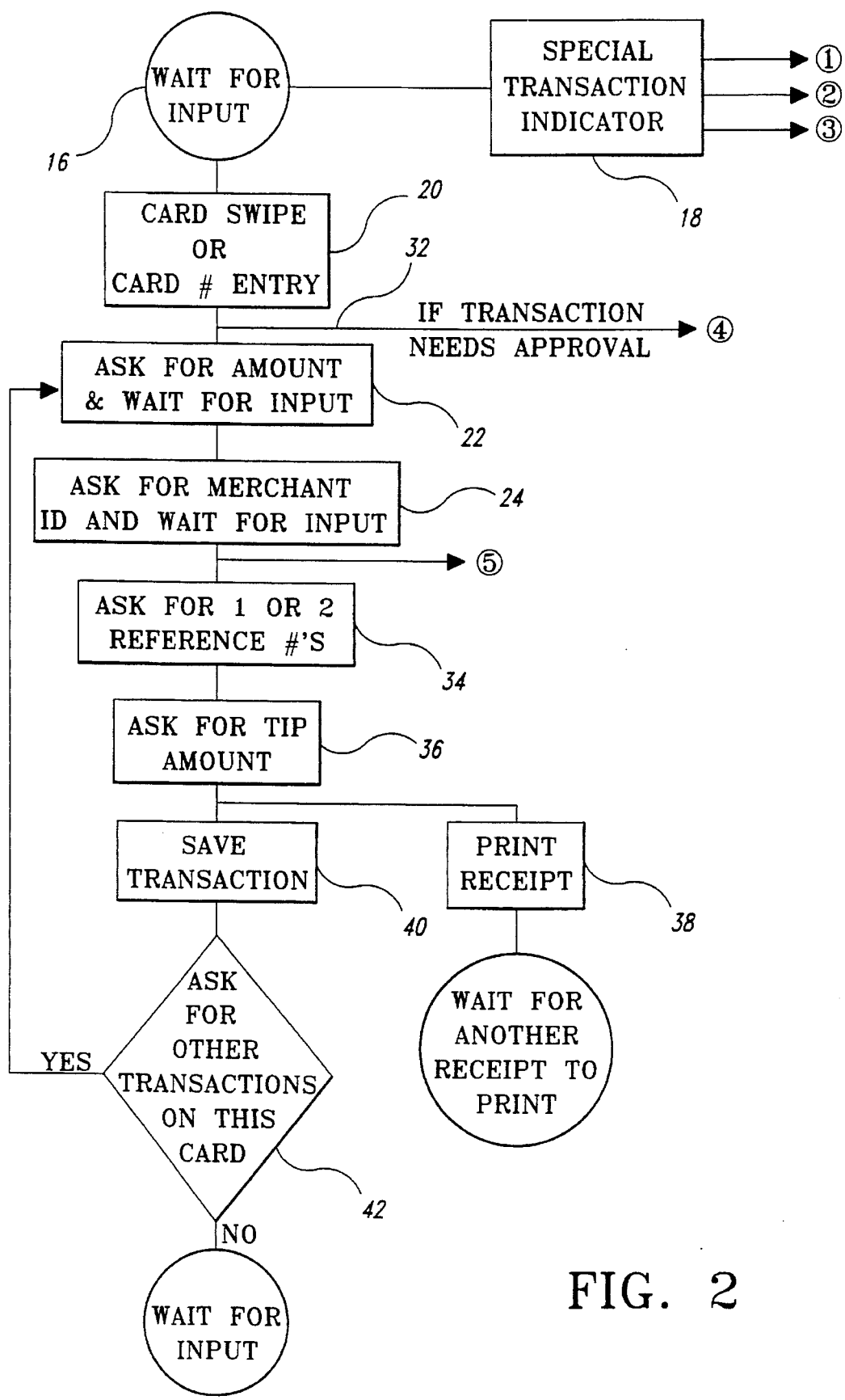
FIG. 2 is a flow chart showing how the software of the CAT needs to be modified or enhanced in order to implement the invention.

Referring now to FIG. 2, and in accordance with what is considered to be the invention, it is easy to program and add enhanced functionality to the conventional FUSA terminal, or other conventional terminals, so that it will allow the input of information from multiple merchants, as opposed to a single merchant. FIG. 2 illustrates how the programming of a conventional terminal must be changed in order to implement multiple merchant processing.

Directing attention to FIG. 2, an enhanced terminal 10 is initialized in conventional fashion, as indicated at 16, 18, and 20. The enhanced terminal 10 will then ask the merchant for the amount to be authorized, as indicated at 22. This is conventional. Unlike conventional terminals, however, the enhanced terminal is programmed so that it will ask the merchant to input a unique ID number, or unique merchant code, as indicated at 24. The code links the transaction to a particular merchant. In accordance with the invention, this input is preassigned for each merchant user of the terminal.

After entry of the merchant's code, as shown at 24, if the transaction is of a type that needs approval, the terminal 10 will transmit to the appropriate transaction processing entity. This is indicated at 26 in FIG. 3. After the connection to the transaction processing entity is made, as shown at 28, the terminal 10 requests charge authorization in conventional fashion, as shown at 30. Other merchants may subsequently enter their own transactions separately at the same terminal by using their own codes.

In order to make the dial-in procedure more efficient, the terminal 10 may commence the dial-in and authorization process while it is waiting for information from the merchant. For example, dialing usually commences as soon as the card is identified (usually by swiping it through slot 12 (see FIG. 1)) and before the merchant inputs further information (the individual merchant's identifying code, for example). This is schematically indicated at 32 in FIG. 1.

The enhanced terminal 10, like conventional terminals, may also request additional information. For example, it may ask the merchant to input reference numbers corresponding to the transaction, as indicated at 34 (this will vary depending on the user environment). It may also request tip amounts, or print receipts, if requested, as respectively shown at 36, 38. The sequence of these operations may vary depending on where and how the terminal is used. For example, FIG. 2 shows entry of tip amount 36 occurring after input of merchant ID 24 and/or reference numbers 34. In actuality, it may be more efficient to input tip amount or similar transactional information prior to input of merchant ID information. That is the way it is done in the enhanced FUSA terminal, for example.

In many or most cases relating to credit card transactions, each transaction is saved, as indicated at 40. As would be understood, this may not always be the case in connection with other kinds of transactions (check verification, for example).

A very unique feature of the enhanced terminal is that it may also process more than one merchant transaction for a single card, as shown at 42. In other words, and by way of nonlimiting example, once a single credit card is swiped through the terminal 10, a first merchant may enter a transaction on the terminal by using the identifying code unique to that merchant. This could be followed by a second merchant entering a transaction on the same card using the second merchant's identifying code.

An example of the above situation might be a golf course where a golf pro is a separate merchant from the golf course operator. A player may want to use his credit card for both green fees (the golf course operator is one merchant) and goods or services purchased from the golf pro (the second merchant). Both merchants could charge their services to the same card with a single card swipe at the counter and the terminal 10 separates each merchant's transaction for processing by the applicable transaction processing entity.

Figure 3:
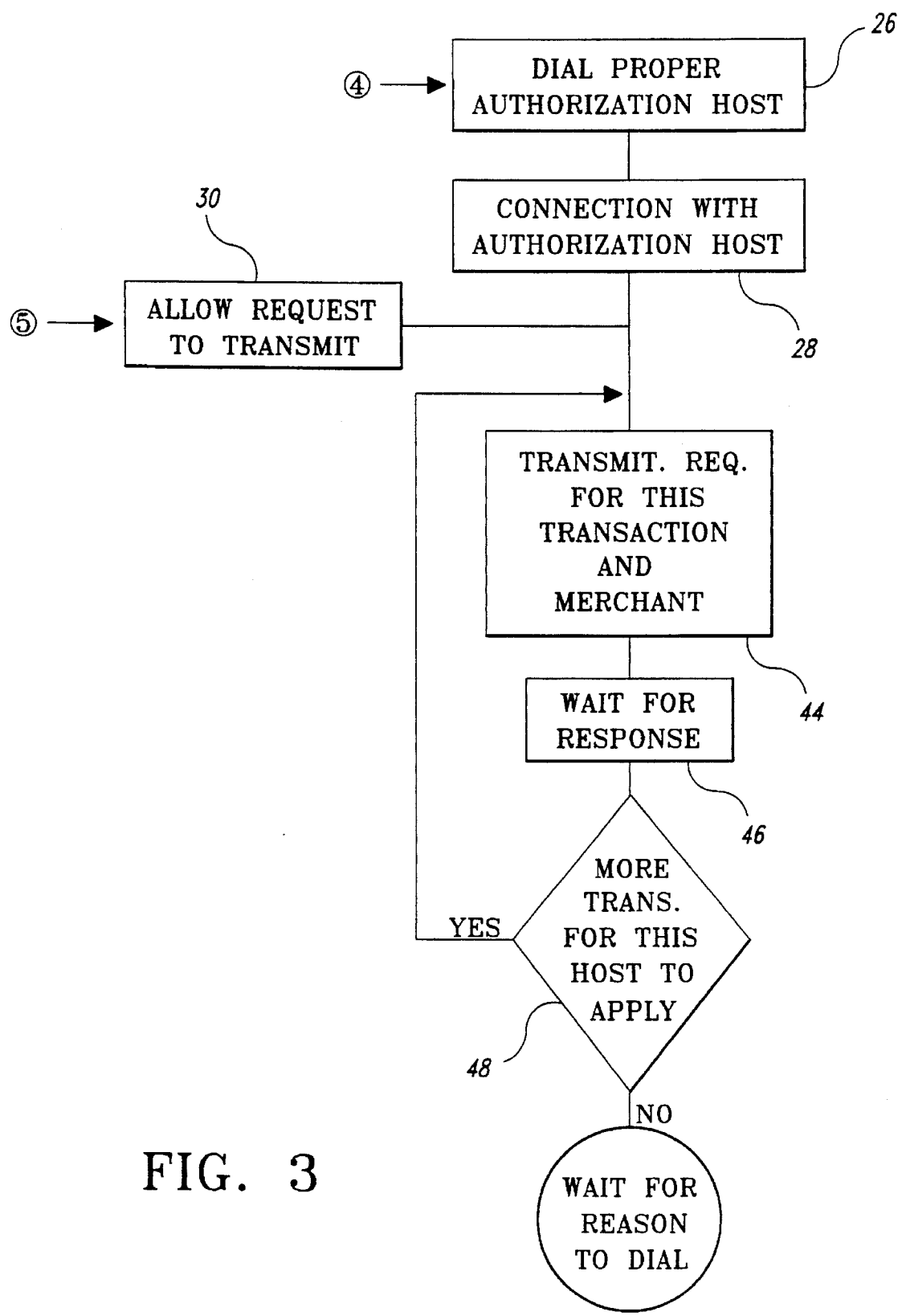
FIG. 3 is a continuation of the flow chart shown in FIG. 2.

As shown at 30 in FIG. 3, terminal requests for authorization may be made after all or only some information is entered. After a request is made, and transmitted to the transaction processing entity (as indicated at 44), the entity responds with an authorization (as shown at 46). The terminal 10 continues to process transactions requested by the merchant or merchants until all transactions have been completed (as shown at 48).

Referring now to FIG. 4, the enhanced terminal 10 allows each individual merchant to print and review his or her transactions. Each merchant first initiates the transaction reviewing process, as shown at 50. Then, the merchant is identified by entering an appropriate ID code, as shown at 52. At that point, the enhanced terminal 10 operates in the same fashion as conventional CATs. One or all merchants may review any single transaction, or all transactions, as indicated at 54.

At the end of a business day, the enhanced terminal 10 may be used to settle transactions for one or all merchants. Referring now to FIG. 5, transaction settlement 56 is initiated by an input 58 from each merchant using the terminal. The terminal 10 automatically connects to the appropriate transaction processing entity 60, and transmits transaction information for each merchant, as shown at 62. The processing entity then automatically processes the transaction information, as shown at 64.

It is to be understood that the preceding description illustrates an enhanced version of the FUSA Corporation CAT. It is possible that the FUSA Corporation CAT could be enhanced or improved in many other ways while still embodying what is considered to be the invention.

The FUSA terminal is easily programmable using "C" programming language. The skilled person, having the above information, could easily adapt existing code supplied with the terminal to implement the multiple merchant features described above. The invention is not to be limited by the preceding description. Instead, the invention is to be limited only by the subjoined patent claim or clams.

What is claimed is:

1. An improved method of allowing multiple merchants to obtain credit card authorization for customers, comprising:

providing a credit card authorization terminal, the terminal being adapted to obtain data from a credit card and connectable to a credit charge authorizing entity; and allowing a plurality of merchants to request credit card authorization from the card authorization terminal.

2. An improved method of allowing multiple merchants to process financial transactions, comprising:

providing a transaction authorization terminal, the terminal being adapted to obtain transactional data from a merchant and being connectable to a transaction processing entity; and allowing a plurality of merchants to request transaction authorization from the terminal.

3. An improved method of allowing multiple merchants to process financial transactions, comprising:

providing a transaction authorization terminal, the terminal being adapted to obtain transactional data from a merchant and being connectable to a transaction processing entity;

allowing a plurality of merchants to request transaction authorization from the terminal; and enabling the terminal to selectively print transaction reports for any one or all of the merchants.

4. An improved method of allowing multiple merchants to process financial transactions, comprising:

providing a transaction authorization terminal, the terminal being adapted to obtain transactional data from a merchant and being connectable to a plurality of transaction processing entities;

allowing a plurality of merchants to request transaction authorization from the terminal; and enabling the terminal to selectively settle transactions for any one or all of the merchants with any one of the transaction processing entities.

\* \* \* \* \*